US012630140B2

(12) United States Patent
Ha et al.

(10) Patent No.: US 12,630,140 B2
(45) Date of Patent: *May 19, 2026

(54) CONTROL UNIT OF ELECTRONIC PARKING BRAKE SYSTEM

(71) Applicant: HL MANDO CORPORATION, Gyeonggi-do (KR)

(72) Inventors: Jung Rae Ha, Gyeonggi-do (KR); Min Ho Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 604 days.

This patent is subject to a terminal disclaimer.

(21) Appl. No.: 17/925,610

(22) PCT Filed: Sep. 2, 2021

(86) PCT No.: PCT/KR2021/011888
§ 371 (c)(1),
(2) Date: Nov. 16, 2022

(87) PCT Pub. No.: WO2022/050735
PCT Pub. Date: Mar. 10, 2022

(65) Prior Publication Data
US 2023/0339447 A1 Oct. 26, 2023

(30) Foreign Application Priority Data
Sep. 2, 2020 (KR) ........................ 10-2020-0111396

(51) Int. Cl.
*B60T 17/22* (2006.01)
*B60T 13/74* (2006.01)

(52) U.S. Cl.
CPC ........... *B60T 17/22* (2013.01); *B60T 13/741* (2013.01); *B60T 2270/404* (2013.01); *B60T 2270/413* (2013.01)

(58) Field of Classification Search
CPC ... B60T 8/88; B60T 8/92; B60T 8/885; B60T 13/741; B60T 17/22; B60T 17/221;
(Continued)

(56) References Cited

U.S. PATENT DOCUMENTS

| | | | | | |
|---|---|---|---|---|---|
| 11,801,819 | B2 * | 10/2023 | Kim | ........................ | B60T 17/22 |
| 2022/0194344 | A1 * | 6/2022 | Tarandek | .................. | B60T 8/17 |
| 2023/0032084 | A1 * | 2/2023 | Ha | ........................... | B60R 16/00 |

FOREIGN PATENT DOCUMENTS

JP 2004-314756 11/2004

OTHER PUBLICATIONS

Office Action dated Feb. 22, 2024 for Korean Patent Application No. 10-2022-7027984 and its English translation by Google Translate.

* cited by examiner

*Primary Examiner* — John Kwon
(74) *Attorney, Agent, or Firm* — WOMBLE BOND DICKINSON (US) LLP

(57) ABSTRACT

The present disclosure relates to a device for securing redundancy of an electric parking brake system, which includes a first MCU (micro control unit) having a driver circuit including a first driver circuit and a second driver circuit respectively connected to a first motor and a second motor for providing a driving force to an electric parking brake to control the first motor and the second motor, and a plurality of core processors to control the first driver circuit and the second driver circuit connected according to reception of an electric parking brake (EPB) switch signal, a second MCU having one core processor and connected to the second driver circuit, a first switch for connecting the first MCU and the second driver circuit, and a second switch for connecting the second MCU and the second driver
(Continued)

-------- Hydraulic line
Electric signal line circuit, and it may be applied to other exemplary embodiments.

10 Claims, 8 Drawing Sheets

(58) Field of Classification Search
CPC .......... B60T 2270/82; B60T 2270/402; B60T
2270/413; B60W 10/18; B60W 10/182;
B60W 30/18; B60W 30/109
See application file for complete search history.

———— Hydraulic line
-------- Electric signal line

——— Hydraulic line
-------- Electric signal line

CONTROL UNIT OF ELECTRONIC PARKING BRAKE SYSTEM

CROSS-REFERENCE TO RELATED APPLICATIONS

This application is the national stage of International Patent Application No. PCT/KR2021/011888 filed on Sep. 2, 2021, which claims priority to Korean Patent Application No. 10-2020-0111396 filed in the Korean Intellectual Property Office on Sep. 2, 2020, the disclosures of which are incorporated by reference herein in their entireties.

TECHNICAL FIELD

The present disclosure relates to an electric control unit of an electric parking brake system.

BACKGROUND ART

Recently released vehicles use an electric parking brake (EPB) device that electronically controls the driving of a parking brake, and the EPB device is mounted on a general disk brake to perform the function of a parking brake.

The electric parking brake device may automatically operate or release a parking brake according to the control determination of an electronic control unit (ECU) that performs a simple switch operation or overall control even though the driver does not manually operate the parking brake. The electric parking brake device is configured with an actuator that drives a motor for generating a braking force and a micro control unit (MCU) for driving the actuator.

Recently, as interest in autonomous vehicles or electric vehicles has increased, the brake system has also Teen developed, such as using an electronic master booster instead of a hydraulic system. As a result, the integrated dynamic brake (IDB) system has been developed, in which the anti-lock brake system (ABS) and the electric stability control (ESC) system are integrated. Since the TDB system may control not only a service brake operated during normal driving but also a parking brake, it is possible to reduce the size and weight of the brake system and provide various functions, while also significantly improving stability.

Since the TDB system includes a large number of electronic devices in many parts, the ECU includes a plurality of MCUs to increase the reliability of operation of the electric parking brake system. Therefore, even when a fault occurs in any one of the plurality of MCUs, at least one parking brake may still be operated. However, there is a problem in that costs are increased when each of the plurality of MCUs is formed as a multicore to implement the electric parking brake system. In order to solve this problem, there is a need to minimize costs when the electric parking brake system is implemented and secure redundancy of the electric parking brake system so that even when a fault occurs in any one of the plurality of MCUs, at least one parking brake may still be operated to secure safety.

DISCLOSURE

Technical Problem

The exemplary embodiments of the present disclosure for solving these conventional problems provide a control unit of an electric parking brake system that drives at least one actuator by using the other MCU when a fault occurs in any one MCU among a plurality of MCUs.

In addition, the exemplary embodiments of the present disclosure provide a control unit of an electric parking brake system in which a cut-off circuit is implemented in any one actuator.

Technical Solution

The control unit of an electric parking brake system according to an exemplary embodiment of the present disclosure includes a first MCU (micro control unit) having a driver circuit including a first driver circuit and a second driver circuit respectively connected to a first motor and a second motor for providing a driving force to an electric parking brake to control the first motor and the second motor, and a plurality of core processors to control the first driver circuit and the second driver circuit connected according to reception of an electric parking brake (EPB) switch signal, a second MCU having one core processor and connected to the second driver circuit, a first switch for connecting the first sub-MCU and the second driver circuit, and a second switch for connecting the second sub-MCU and the second driver circuit.

In addition, the main MCU performs communication with the first sub-MCU and the second sub-MCU through a data bus.

In addition, the control unit further includes a watchdog counter for monitoring an operation of the second sub-MCU from the outside of the second sub-MCU.

In addition, the second switch is turned off when the first sub-MCU operates normally.

In addition, the second sub-MCU receives the EPB switch signal through in-vehicle communication when a fault occurs in the first sub-MCU, and turns on the second switch to control the second driver circuit.

In addition, the control unit further includes a third switch for connecting the first sub-MCU and the first driver circuit.

In addition, the control unit further includes a fourth switch for connecting the second sub-MCU and the first driver circuit.

In addition, when the first sub-MCU operates normally, the first switch and the third switch are turned on to control the first driver circuit and the second driver circuit.

In addition, the second sub-MCU receives the EPB switch signal through in-vehicle communication when a fault occurs in the first sub-MCU, and turns on the second switch and the fourth switch to control the first driver circuit and the second driver circuit.

In addition, the second driver circuit further includes a cut-off switch for preventing a malfunction of the second sub-MCU when the first sub-MCU operates normally, wherein the cut-off switch is provided between a low arm of the second driver circuit and a ground.

Moreover, the control unit of an electric parking brake system according to an exemplary embodiment of the present disclosure includes a driver circuit including a first driver circuit and a second driver circuit respectively connected to a first motor and a second motor for providing a driving force to an electric parking brake to control the first motor and the second motor; a first sub-MCU (micro control unit) having at least one processor to control the first driver circuit and the second driver circuit connected according to reception of an electric parking brake (EPB) switch signal, a second sub-MCU having at least one core processor and connected to the second driver circuit, a main MCU for controlling communication between the first sub-MCU and the second sub-MCU, a first switch for connecting the first sub-MCU and the second driver circuit, and a second switch for connecting the second sub-MCU and the second driver circuit.

In addition, the main MCU performs communication with the first sub-MCU and the second sub-MCU through a data bus.

In addition, the control unit further includes a watchdog counter for monitoring an operation of the second sub-MCU from the outside of the second sub-MCU.

In addition, the second switch is turned off when the first sub-MCU operates normally.

In addition, the second sub-MCU receives the EPB switch signal through in-vehicle communication when a fault occurs in the first sub-MCU, and turns on the second switch to control the second driver circuit.

In addition, the control unit further includes a third switch for connecting the first sub-MCU and the first driver circuit.

In addition, the control unit further includes a fourth switch for connecting the second sub-MCU and the first driver circuit.

In addition, when the first sub-MCU operates normally, the first switch and the third switch are turned on to control the first driver circuit and the second driver circuit.

In addition, the second sub-MCU receives the EPB switch signal through in-vehicle communication when a fault occurs in the first sub-MCU, and turns on the second switch and the fourth switch to control the first driver circuit and the second driver circuit.

In addition, the second driver circuit further includes a cut-off switch for preventing a malfunction of the second sub-MCU when the first sub-MCU operates normally, wherein the cut-off switch is provided between a low arm of the second driver circuit and a ground.

The control unit of an electric parking brake system according to an exemplary embodiment of the present disclosure includes a first sub-MCU (micro control unit) having a driver circuit including a first driver circuit and a second driver circuit respectively connected to a first motor and a second motor for providing a driving force to an electric parking brake to control the first motor and the second motor, and at least one core processor to control the first driver circuit and the second driver circuit connected according to reception of an electric parking brake (EPB) switch signal; a second sub-MCU having at least one core processor and connected to at least one of the first driver circuit and the second driver circuit; a main MCU for controlling communication between the first sub-MCU and the second sub-MCU; a first switch for connecting the first sub-MCU and the second driver circuit; and a second switch for connecting the second sub-MCU and the second driver circuit.

Advantageous Effects

As described above, the control unit of an electric parking brake system according to the present disclosure has an effect of securing the redundancy of the electric parking brake system by driving at least one actuator using the other MCU when a fault occurs in any one MCU among a plurality of MCUs.

In addition, the control unit of an electric parking brake system according to the present disclosure implements a cut-off circuit in any one actuator, and when a plurality of actuators are normally driven by any one MCU, it has an effect of preventing malfunction in the other MCU by the cut-off circuit.

[Modes of the Invention]

Figure 1:
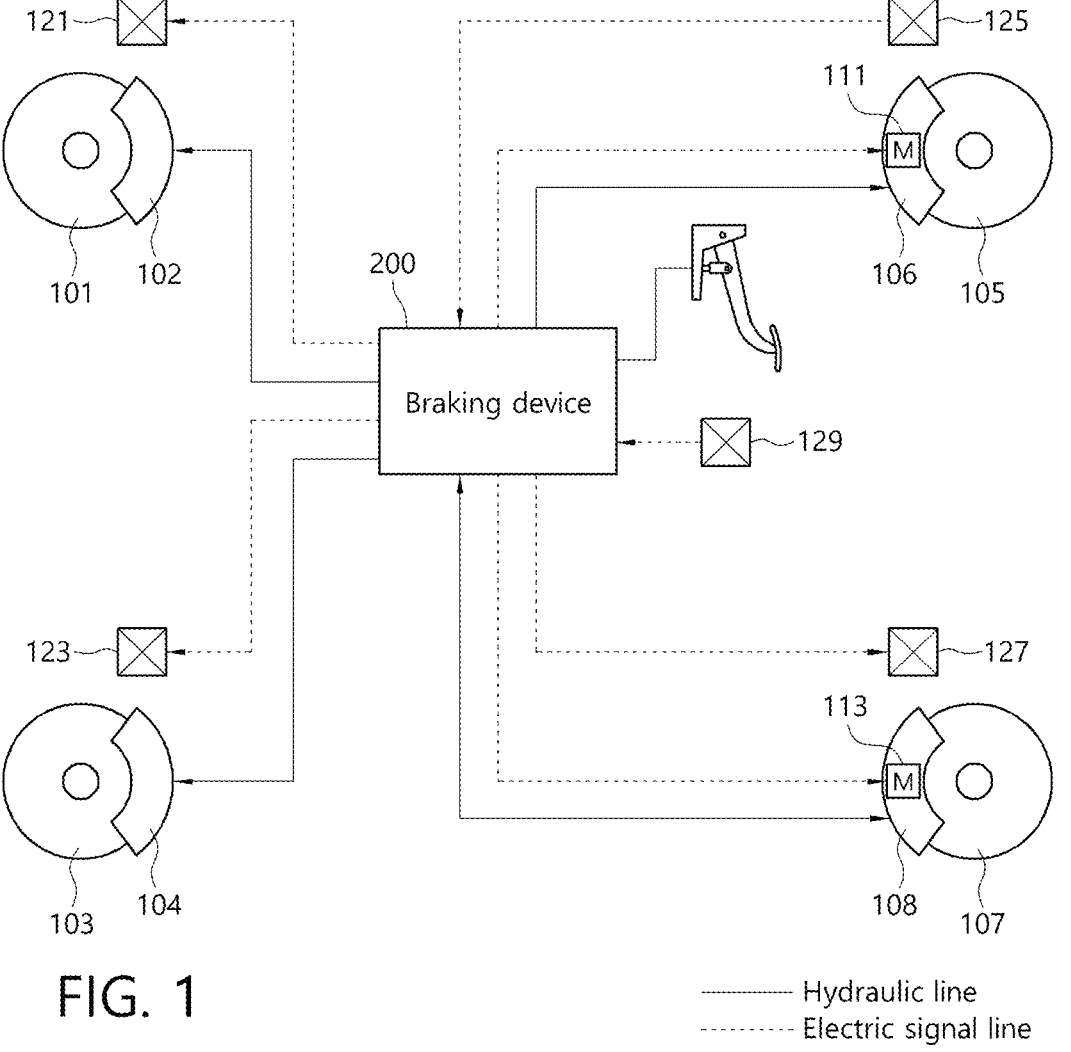
FIG. 1 is a view showing the schematic structure of an electric parking brake system according to an exemplary embodiment of the present disclosure.

The exemplary embodiments of the present disclosure are provided to more fully describe the present disclosure to those of ordinary skill in the art, the following exemplary embodiments may be modified into various other forms, and the scope of the present disclosure is not limited to the following exemplary embodiments. Rather, these exemplary embodiments are provided so that the present disclosure will be more thorough and complete, and will fully convey the concept of the present disclosure to those of ordinary skill in the art.

The terminology used herein is for the purpose of describing particular exemplary embodiments only and is not intended to limit the present disclosure. As used herein, the singular forms may include plural forms unless the context clearly indicates otherwise. In addition, when used in the present specification, the terms "comprise" and/or "comprising" specify the presence of the stated shapes, numbers, steps, operations, members, elements and/or groups thereof and do not preclude the presence or addition of one or more other shapes, numbers, operations, members, elements and/or or groups thereof. As used herein, the term "and/or" may include any and all combinations of one or more of the associated listed items Hereinafter, the exemplary embodiments of the present disclosure will be described with reference to the drawings schematically illustrating the exemplary embodiments of the present disclosure. In the drawings, variations of the illustrated shape may be expected, for example, depending on manufacturing technology and/or tolerances. Therefore, the exemplary embodiments of the present disclosure should not be construed as limited to the specific shape of the region illustrated in the present specification, but should include, for example, changes in shape caused by manufacturing.

FIG. 1 is a view showing the schematic structure of an electric parking brake system according to an exemplary embodiment of the present disclosure.

Referring to FIG. 1, the electric parking brake system largely includes a brake pedal, wheels 101, 103, 105, 107 of a vehicle, calipers 102, 104, 106, 108 for applying a braking force to each of the wheels 101, 103, 105, 107, wheel speed sensors (WSS) 121, 123, 125, 127 for checking the rotational speed of each of the wheels 101, 103, 105, 107, PTS 129, motors 111, 113 for controlling the driving of a parking brake formed so as to be electronically operated through an external force on the rear wheels 105, 107 of the vehicle and a braking device 200.

The first wheel 101 and the second wheel 103 are formed at the front of the vehicle, and when an external force is applied to the brake pedal on the first wheel 101 and the second wheel 103, a first caliper 102 and a second caliper 104 for applying a braking force to each of the wheels 101, 103 are formed. In addition, the third wheel 105 and the fourth wheel 107 are formed at the rear of the vehicle, and when an external force is applied to the brake pedal on the third wheel 105 and the fourth wheel 107, a third caliper 106 and a fourth caliper 108 for apply a braking force to each of the wheels 105, 107 are formed. Moreover, when an external force is generated in an electric parking brake (EPB) switch, the first motor 111 and the second motor 113 for controlling the driving of the wheels 105, 107 of the vehicle by driving the electronically operated parking brake are formed.

In addition, the WSS 121, 123, 125, 127 check the wheel rotation speed and provides it to the braking device 200, and the PTS 129 is a pedal sensor, which detects an external force generated on the brake pedal from the outside of the vehicle and provides it to the braking device 200. The braking device 200 operates the calipers 102, 104, 106, 108 based on signals provided from the PTS 129 to apply a braking force to each of the wheels 101, 103, 105, 107.

Figure 2:
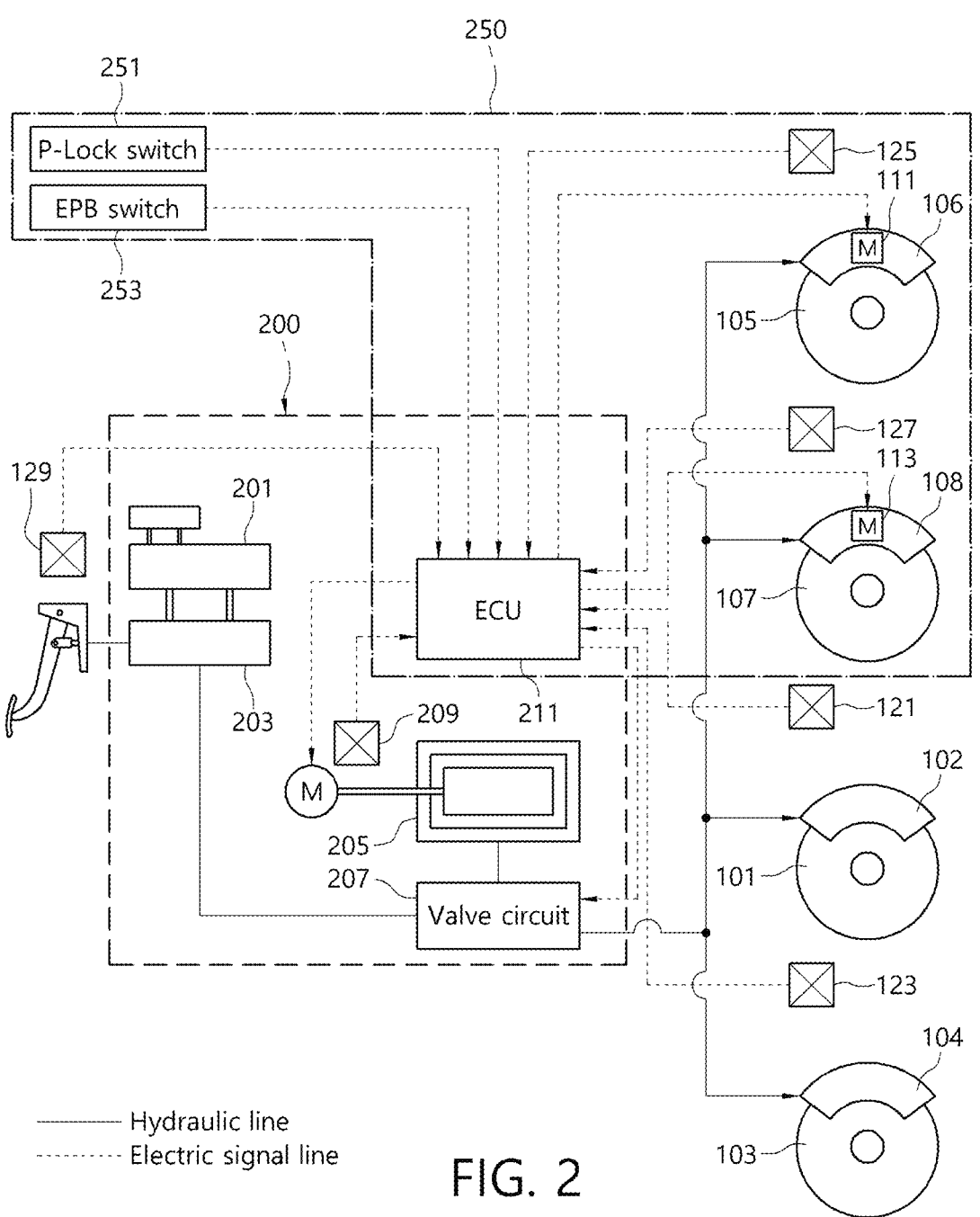
FIG. 2 is a view showing the schematic structure of a braking device illustrated in FIG. 1.

FIG. 2 is a view showing the schematic structure of a braking device illustrated in FIG. 1.

Referring to FIG. 2, the braking device 200 may largely include a reservoir 201, a master cylinder 203, a hydraulic pressure supply device 205, a valve circuit 207, an MPS 209 and an ECU 211.

The reservoir 201 stores a pressurized medium for generating pressure by flowing along the flow path. The pressurized medium flows to the required place according to the control of the valve. Although not illustrated, a simulator valve is created in the flow path of the reservoir 201 to control the flow of the pressurized medium between the reservoir 201 and the master cylinder 203. During normal operation, the simulator valve is open such that the user interlocks the reservoir 201 and the master cylinder 203, and in the abnormal mode, the simulator valve is closed such that the pressurized medium of the master cylinder 203 is transferred to valves for controlling a wheel cylinder through a backup flow path.

The master cylinder 203 pressurizes and discharges a pressurized medium such as brake oil or the like accommodated therein when the driver presses the brake pedal. This provides the driver with a reaction force according to the braking force. In addition, the PTS 129 senses an external force generated on the brake pedal from the outside of the vehicle and provides it to the ECU 211.

The hydraulic pressure supply device 205 generates a hydraulic pressure according to the position of the pedal and transmits the hydraulic pressure to the wheel cylinders of the wheels 101, 103, 105, 107 such that the vehicle is braked. In order to generate a hydraulic pressure, the hydraulic pressure supply device 205 includes a motor. In addition, the braking device 200 includes an MPS 209. The MPS 209 is a motor position sensor, which measures the exact rotational position of the motor included in the hydraulic pressure supply device 205 and provides it to the ECU 211.

The valve circuit 207 may control a plurality of relief valves for controlling the flow path between the hydraulic pressure supply device 205 and the wheel cylinder, a plurality of outlet valves for controlling the flow path between the master cylinder 203 and the wheel cylinder, a simulator valve for forming a pedal feeling and a cut valve for controlling a backup flow path between the master cylinder 203 and the wheel cylinder.

Moreover, the ECU 211 receives sensing signals from a P-Lock switch 251, an EPB switch 253, a PTS 129, an MPS 209 and a plurality of WSSs 121, 123, 125, 127, and performs an operation corresponding to the provided sensing signals. More specifically, when the brake pedal is pressed by the driver, the PTS 129 detects the degree of the brake pedal being pressed, and the PTS 129 provides this to the ECU 211.

When the ECU 211 receives a P-lock switch signal through the P-lock switch 251 after the vehicle stops running, the calipers 102, 104, 106, 108 that are respectively formed in a plurality of wheels 101, 103, 105, 107 are activated. More specifically, when the P-lock switch signal is received through the P-lock switch 251, the ECU 211 transmits a signal to control a plurality of relief valves for controlling the flow path between the hydraulic pressure supply device 205 and the wheel cylinder to the valve circuit 207.

The ECU 211 receives the speeds of the wheels 101, 103, 105, 107 from the WSSs 121, 123, 125, 127 to detect the parking state. In addition, when the ECU 211 receives an EPB switch signal through the EPB switch 253 after the vehicle stops running, the first motor 111 and the second motor 113 are operated to control the driving of the parking brake respectively formed in the third wheel 105 and the fourth wheel 107 formed at the rear of the vehicle. As such, various examples of securing vehicle redundancy by using the electric parking brake system 250 including the ECU 211 will be described in detail with reference to FIGS. 3 to 8 below.

Figure 3:
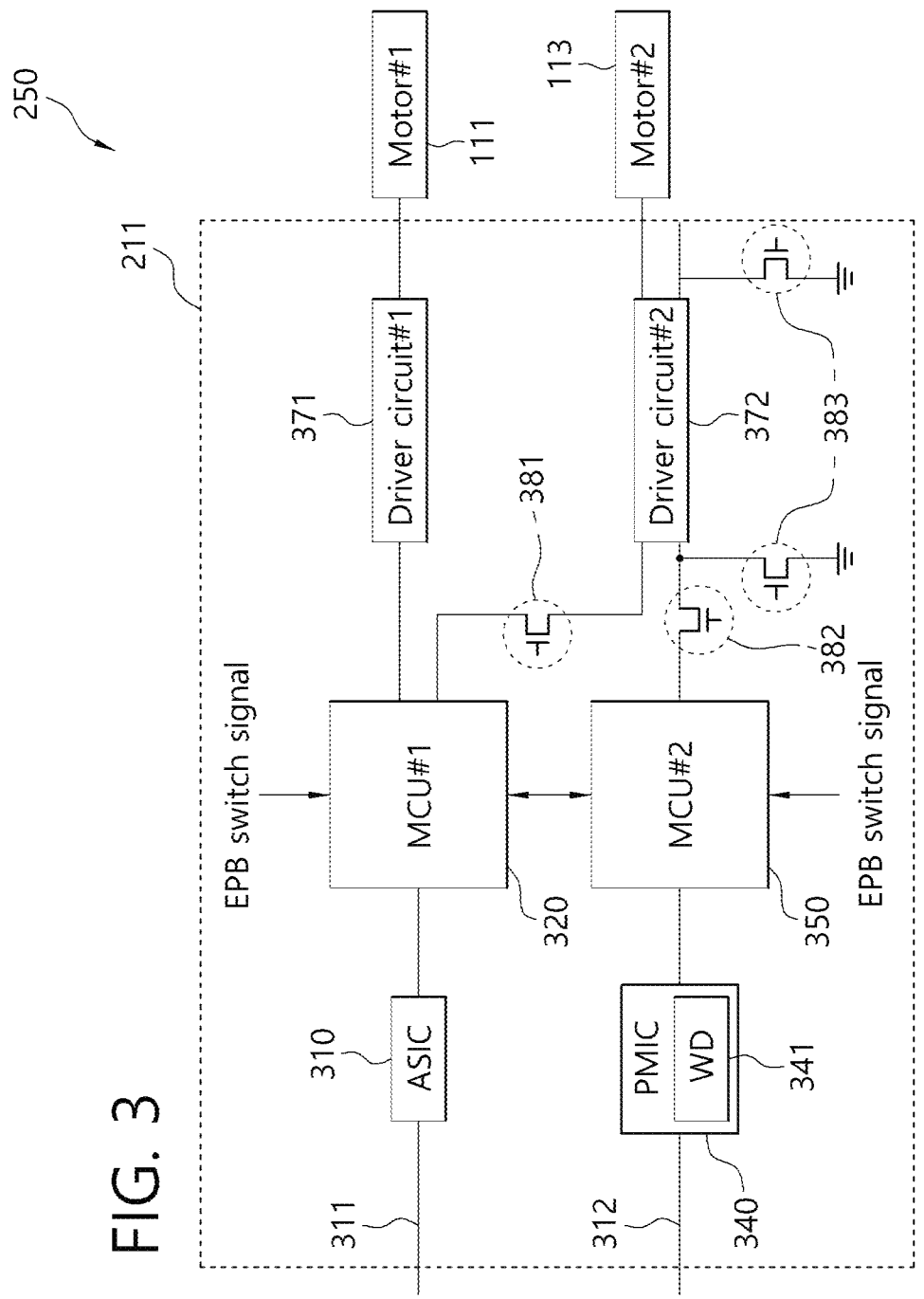
FIG. 3 is a view showing the schematic configuration of an electric parking brake system according to a first example of the present disclosure.

FIG. 3 is a view showing the schematic configuration of an electric parking brake system according to a first example of the present disclosure.

Referring to FIG. 3, the electric parking brake system 250 according to the first example of the present disclosure may include an ECU 211 and motors 111, 113. The ECU 211 includes an ASIC 310, a first MCU 320, a first driver circuit 371, a PMIC 340, a second MCU 350 and a second driver circuit 372. The first driver circuit 371 and the second driver circuit 372 are one component of an actuator that drives a motor that generates a braking force on the wheels 101, 103, 105, 107. In this case, it is preferable that the first MCU 320 has a plurality of core processors, and the second MCU 350 is implemented as a single core processor.

Although not illustrated, the first MCU 320 and the second MCU 350 may include an MCU and a motor driver IC, respectively. The PMIC 340 includes a watchdog (WD) 341 counter (hereinafter, referred to as a WD 341). The WD 341 senses the operation of the second MCU 350. In addition, the first driver circuit 371 and the second driver circuit 372 are respectively connected to the first motor 111 and the second motor 113.

The ASIC 310 and the PMIC 340 receive power from at least one battery of the vehicle, and supply power to the first MCU 320 and the second MCU 350 based on the corresponding power, respectively. In this case, the ASIC 310 and the PMIC 340 are supplied with power through a power line separated into the first power line 311 and the second power line 312, respectively. Power supplied to the first power line 311 and the second power line 312 may be output from the same battery or may be output from different batteries, and the voltages of the respective power sources may be identical or different. The ECU 211 may include a transformer (not illustrated) capable of making the voltages of the first power and the second power output from the same battery different.

A motor driver IC (not illustrated) included in the first MCU 320 receives an EPB switch signal generated from the EPB switch. When the EPB switch signal is received, the first MCU 320 turns on the first switch 381 connecting the first MCU 320 and the second driver circuit 372. The first MCU 320 provides the EPB switch signal to the first driver circuit 371, and the first switch 381 is turned on to provide the EPB switch signal to the second driver circuit 372 connected to the first MCU 320. Accordingly, the first driver circuit 371 and the second driver circuit 372 control the operation of the respectively connected first motor 111 and the second motor 113 to provide a driving force to the electric parking brake provided in the rear wheel of the vehicle.

As such, when the first MCU 320 is operated normally, the cut-off switch 383 connected between the low arm of the second driver circuit 372 and the ground maintains an off state. Through this, the second switch 382 connecting the second MCU 350 and the second driver circuit 372 is prevented from being turned on such that it is possible to prevent malfunction that the second MCU 350 is operated when the first MCU 320 operates normally.

The first MCU 320 and the second MCU 350 perform communication periodically or in real time through a data bus. Through this, the second MCU 350 checks whether a fault has occurred in the first MCU 320. The second MCU 350 receives an EPB switch signal through CAN communication when it is confirmed that a fault has occurred in the first MCU 320. In this case, the reception of the EPB switch signal is received by a motor driver IC (not illustrated) included in the second MCU 350. When the EPB switch signal is received, the second MCU 350 turns on the second switch 382 connecting the second MCU 350 and the second driver circuit 372. Accordingly, the cut-off switch 383 that is in the off state is converted to the on state. The second MCU 350 operates the second motor 113 connected to the second driver circuit 372 based on the received EPB switch signal to provide a driving force to the electric parking brake connected to the second motor 113. Through this, even if a fault occurs in the first MCU 220, it is possible to secure the redundancy of the parking brake.

Moreover, in the first example of the present disclosure, it is described as an example that the first switch 381, the second switch 382 and the cut-off switch 383 are field effect transistors (FET) that operate as on/off, but the present disclosure is not necessarily limited thereto and may be implemented as a relay switch.

Figure 4:
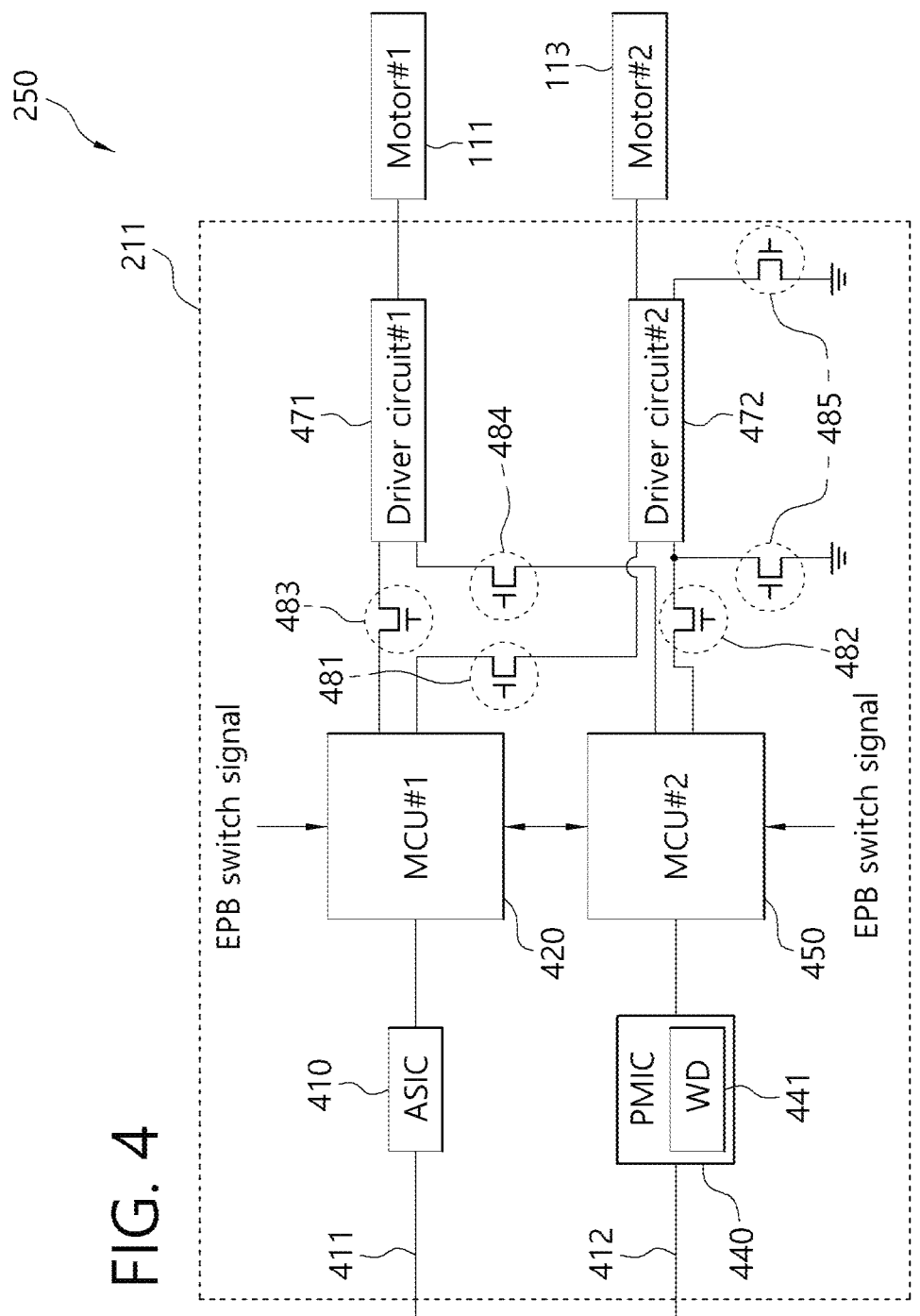
FIG. 4 is a view showing the schematic configuration of an electric parking brake system according to a second example of the present disclosure.

FIG. 4 is a view showing the schematic configuration of an electric parking brake system according to a second example of the present disclosure.

Referring to FIG. 4, the electric parking brake system 250 according to the second example of the present disclosure may include an ECU 211 and motors 111, 113. The ECU 211 includes an ASIC 410, a first MCU 420, a first driver circuit 471, a PMIC 440, a second MCU 450 and a second driver circuit 472. In this case, the ECU 211 is different from the ECU 211 described in the first example in that it additionally includes a third switch 483 and a fourth switch 484, but other components and operations are identical and very similar to the first example. Accordingly, only the configurations and operations different from those of the first example will be described.

When the EPB switch signal generated by the EPB switch is received, the first MCU 420 turns on the third switch 483 connecting the first MCU 420 and the first driver circuit 471, and turns on the first switch 481 connecting the first MCU 420 and the second driver circuit 472. The first MCU 420 provides the EPB switch signal to the first driver circuit 471 and the second driver circuit 472. Accordingly, the first driver circuit 471 and the second driver circuit 472 control the operations of the connected first motor 111 and the second motor 113, respectively.

As such, when the first MCU 420 is operated normally, the cut-off switch 485 connected between the low arm of the second driver circuit 472 and the ground maintains an off state. Through this, the second switch 482 connecting the second MCU 450 and the second driver circuit 472 is prevented from being turned on such that it is possible to prevent malfunction that the second MCU 450 is operated when the first MCU 420 operates normally.

The second MCU 450 receives the EPB switch signal through CAN communication when it is confirmed that a fault has occurred in the first MCU 420, and accordingly turns on the second switch 482 connecting the second MCU 450 and the second driver circuit 472. Accordingly, the cut-off switch 485 that is in the off state is converted to the on state. Moreover, the fourth switch 484 connecting the second MCU 450 and the first driver circuit 471 is turned on. The second MCU 450 provides a driving force to the electric parking brake by operating the first motor 111 and the second motor 113 connected to the first driver circuit 471 and the second driver circuit 472 based on the received EPB switch signal. Through this, even if a fault occurs in the first MCU 420, it is possible to secure the redundancy of the parking brake.

Moreover, in the second example of the present disclosure, it is described as an example that the first switch 481, the second switch 482, the third switch 483, the fourth switch 484 and the cut-off switch 485 are field effect transistors (FET) that operate as on/off, but the present disclosure is not necessarily limited thereto and may be implemented as a relay switch.

Further, in the first and second examples of the present disclosure, if the vehicle is restarted after operating the second MCUs 350, 450 when a fault occurs in the first MCUs 320, 420, the status of the first MCUs 320, 420 is checked. If the first MCUs 320, 420 are normal, the cut-off switches 383, 485 are turned off. However, if the first MCUs 320, 420 are still in a faulty state even after the vehicle is restarted, the operation of the second driver circuits 372, 472 must be controlled, and thus, the cut-off switches 383, 485 may be continuously maintained in the on state. However, this may be applied differently according to the requirements of the manufacturer.

Figure 5:
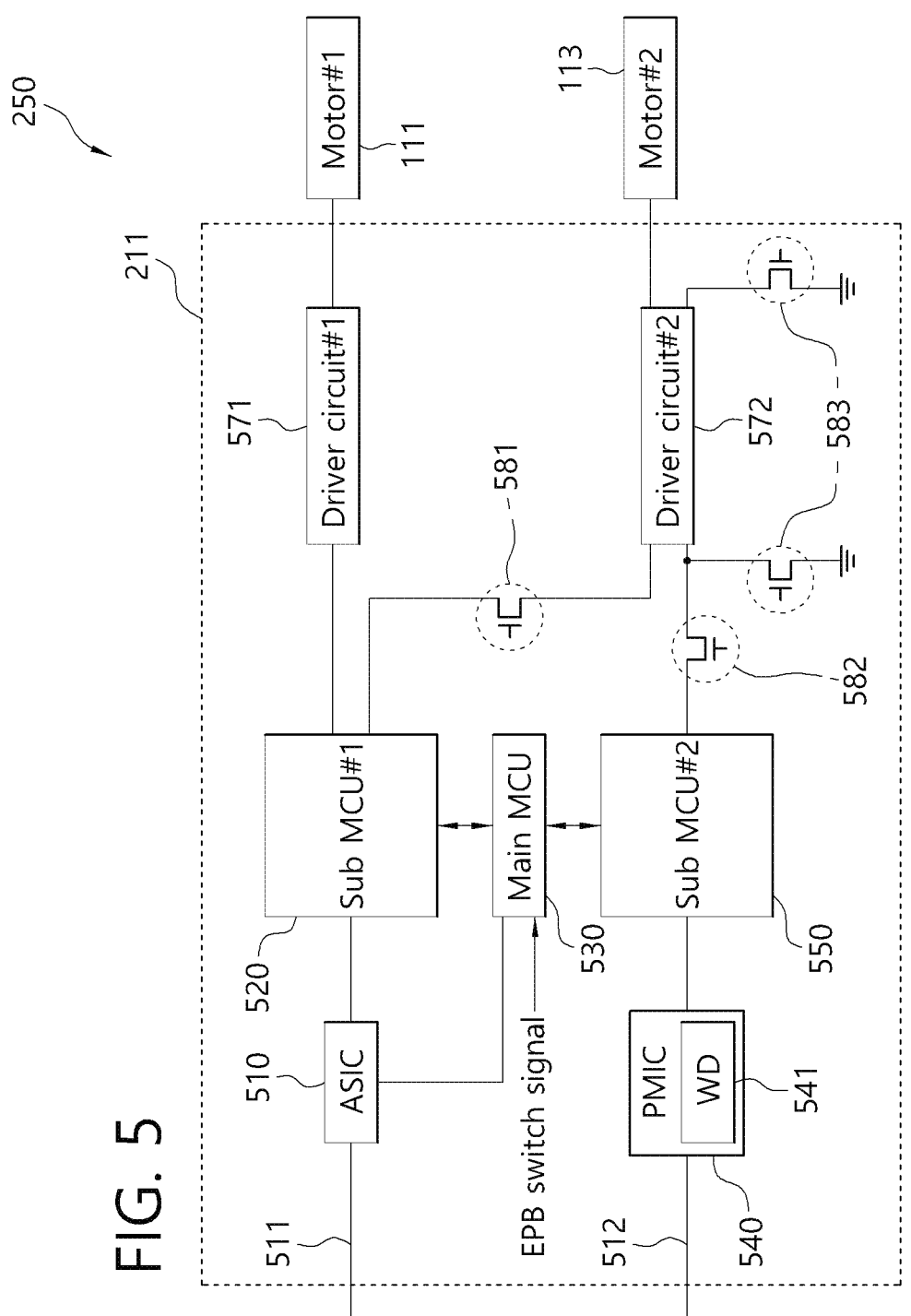
FIG. 5 is a view showing the schematic configuration of an electric parking brake system according to a third example of the present disclosure.

FIG. 5 is a view showing the schematic configuration of an electric parking brake system according to a third example of the present disclosure.

Referring to FIG. 5, the electric parking brake system 250 according to the third example of the present disclosure may include an ECU 211 and motors 111, 113. The ECU 211 includes an ASIC 510, a first sub-MCU 520, a main MCU 530, a first driver circuit 571, a PMIC 540, a second sub-MCU 550 and a second driver circuit 572. In this case, the first sub-MCU 520 and the second sub-MCU 550 are preferably implemented with at least one core processor.

Although not illustrated, the first sub-MCU 520 may include an MCU and a motor driver IC, and the second sub-MCU 550 may include an MCU and a motor driver IC. The PMIC 540 is illustrated as including a watchdog (WD)

541 that detects the operation of the second sub-MCU 550, but when the second sub-MCU 550 is a multi-core processor, the PMIC 540 may not include WD 541. In addition, the first driver circuit 571 and the second driver circuit 572 are respectively connected to the first motor 111 and the second motor 113.

The ASIC 510 and the PMIC 540 are supplied with power from the vehicle's battery. In this case, the ASIC 510 and the PMIC 540 are supplied with power through a power line separated into a first power line 511 and a second power line 512, respectively. The ASIC 510 supplies the power supplied from the first power line 511 to the main MCU 530 and the first sub-MCU 520, and the PMIC 540 supplies the power supplied from the second power line 512 to the second sub-MCU 550. The main MCU 530 is connected to the first sub-MCU 520 and the second sub-MCU 550 through a data bus, respectively, to perform communication. Through this, the main MCU 530 checks the operating state of the first sub-MCU 520 periodically or in real time and provides it to the second sub-MCU 550.

The electric parking brake system 250 according to the third example of the present disclosure may be implemented in the following way.

A motor driver IC (not illustrated) included in the main MCU 530 receives an EPB switch signal generated from the EPB switch. The main MCU 530 transfers the EPB switch signal to any one sub-MCU operating among the first sub-MCU 520 and the second sub-MCU 550. In this case, the sub-MCU may receive an EPB switch signal by performing CAN communication from other ECUs of the vehicle in addition to the main MCU 530. Accordingly, even if a fault occurs in the main MCU 530, the sub-MCUs may still receive the EPB switch signal.

When the EPB switch signal is received by the first sub-MCU 520, the first switch 581 connecting the first sub-MCU 520 and the second driver circuit 572 is turned on. The first sub-MCU 520 provides the EPB switch signal to the first driver circuit 571, and the first switch 581 is turned on to provide the EPB switch signal to the second driver circuit 572 connected to the first sub-MCU 520. Accordingly, the first driver circuit 571 and the second driver circuit 572 control the operations of the connected first motor 111 and the second motor 113, respectively.

The second sub-MCU 550 receives an EPB switch signal through CAN communication when it is confirmed that a fault has occurred in the first sub-MCU 520. When the EPB switch signal is received, the second sub-MCU 550 turns on the second switch 582 connecting the second sub-MCU 550 and the second driver circuit 572. Accordingly, the cut-off switch 583 that is in the off state is converted to the on state. The second sub-MCU 550 provides a driving force to the electric parking brake connected to the second motor 592 by operating the second motor 592 connected to the second driver circuit 572 based on the EPB switch signal received from the motor driver IC (not illustrated) included in the second sub-MCU 550. Through this, even if a fault occurs in the first sub-MCU 520, it is possible to secure the redundancy of the parking brake.

Figure 6:
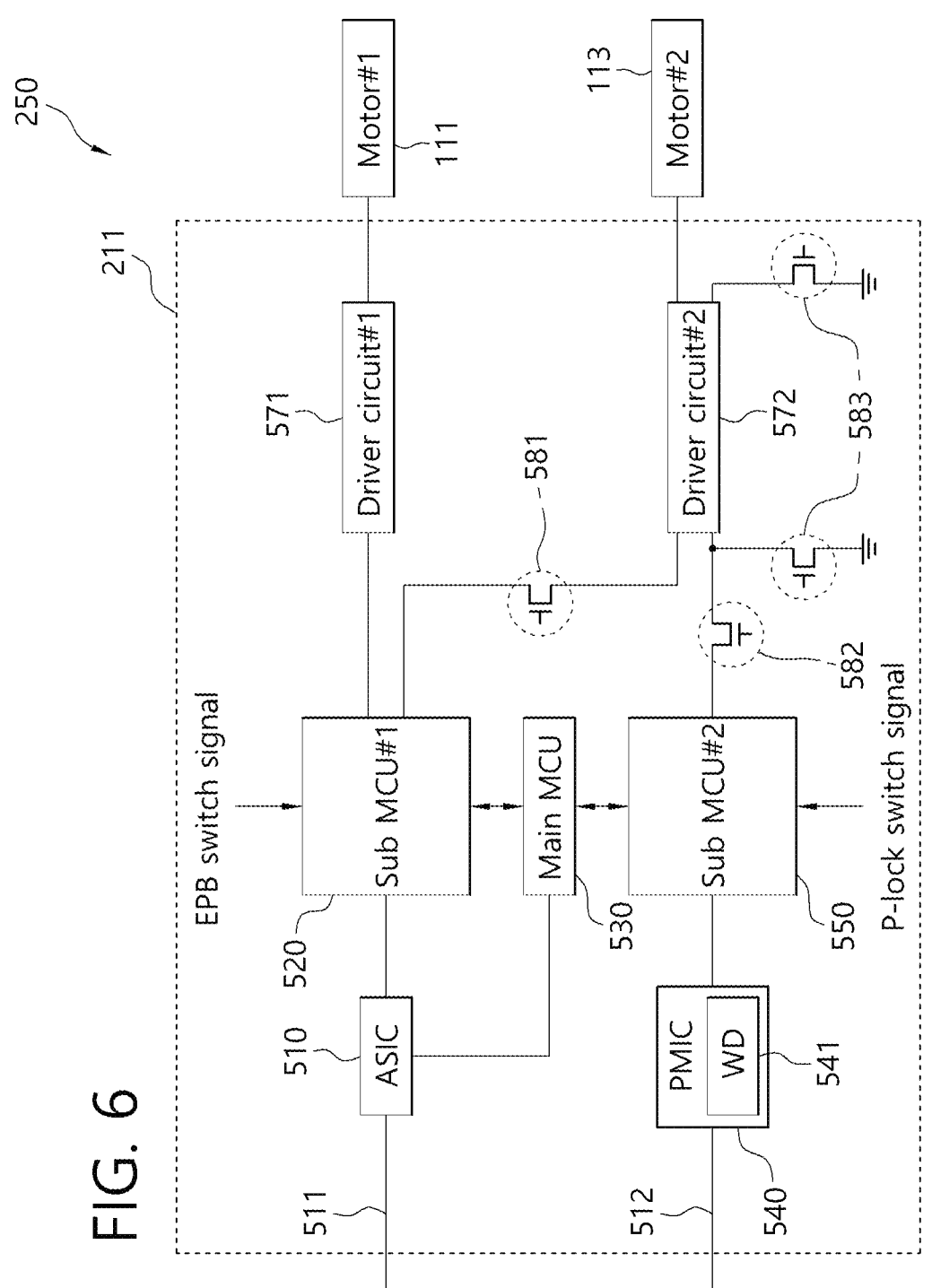
FIG. 6 is a view showing another operation path of the electric parking brake system according to the third example of the present disclosure.
Figure 7:
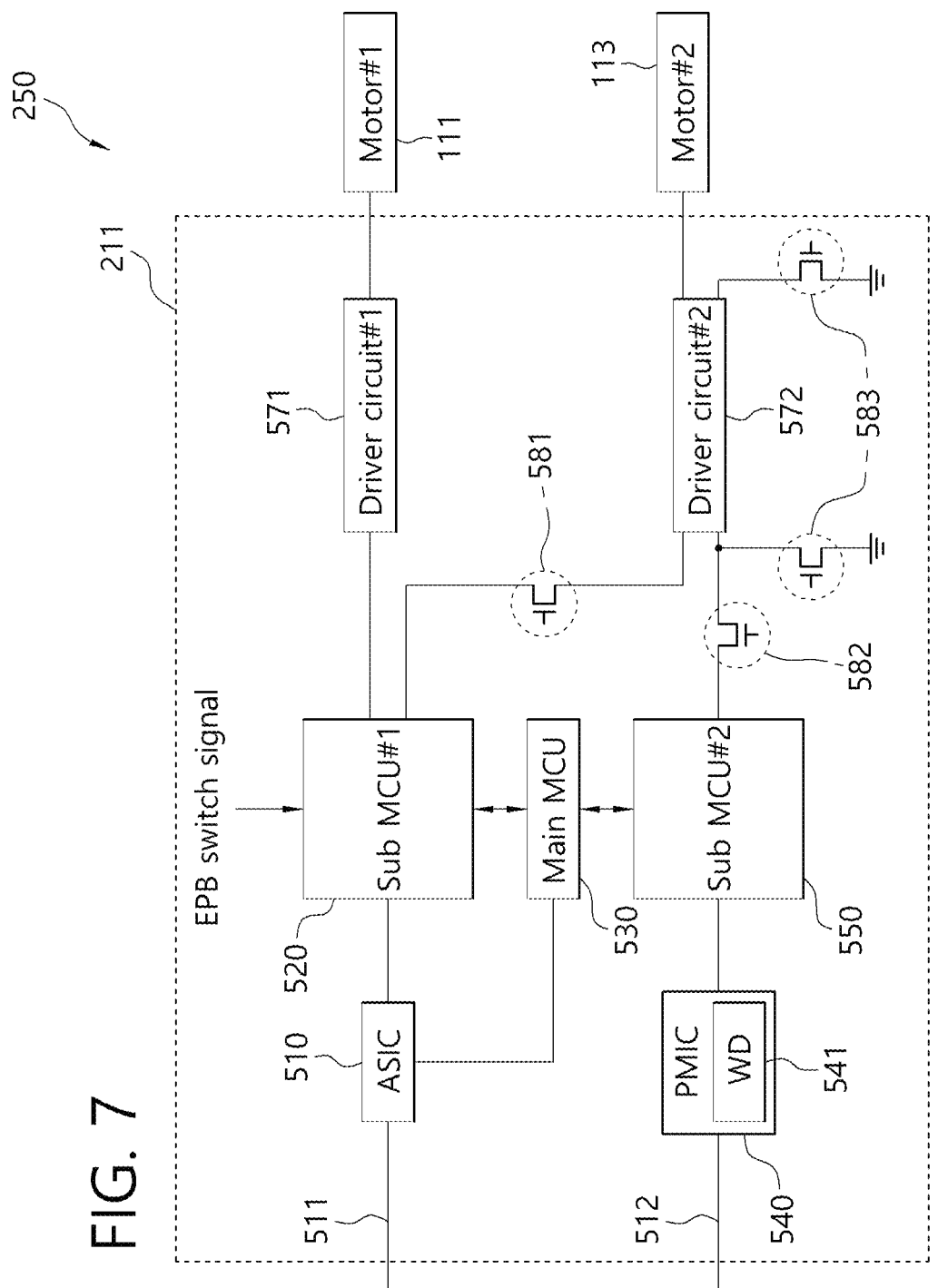
FIG. 7 is a view showing another operation path of the electric parking brake system according to the third example of the present disclosure.

Hereinafter, FIGS. 6 and 7 are views showing other operation paths that may be implemented in the electric parking brake system 250 according to the third example.

In FIG. 6, a motor driver IC (not illustrated) included in the first sub-MCU 520 receives an EPB switch signal generated from the EPB switch. When the EPB switch signal is received, the first sub-MCU 520 turns on the first switch 581 connecting the first sub-MCU 520 and the second driver circuit 572. The first sub-MCU 520 provides the EPB switch signal to the first driver circuit 571, and the first switch 581 is turned on to provide the EPB switch signal to the second driver circuit 572 connected to the first sub-MCU 520. Accordingly, the first driver circuit 571 and the second driver circuit 572 control the operations of the connected first motor 111 and the second motor 113, respectively.

As such, when the first sub-MCU 520 is operated normally, the cut-off switch 583 connected between the low arm of the second driver circuit 572 and the ground maintains an off state. Through this, the second switch 582 connecting the second sub-MCU 550 and the second driver circuit 572 is prevented from being turned on such that it is possible to prevent malfunction that the second sub-MCU 550 is operated when the first sub-MCU 520 operates normally.

The second sub-MCU 550 checks whether a fault has occurred in the first sub-MCU 520 by the main MCU 530. The second sub-MCU 550 may be connected to the P-lock switch 251 described with reference to FIG. 2. The second sub-MCU 550 turns on the second switch 582 connecting the second sub-MCU 550 and the second driver circuit 572 when it is confirmed that a fault has occurred in the first sub-MCU 520. Accordingly, the cut-off switch 583 that is in the off state is converted to the on state. The second sub-MCU 550 receives a P-lock switch signal from the P-lock switch 251 and provides a driving force to the electric parking brake connected to the second motor 592 by operating the second motor 592 connected to the second driver circuit 572 based on the received P-lock switch signal. Through this, even if a fault occurs in the first sub-MCU 520, it is possible to secure the redundancy of the parking brake.

In FIG. 7, a motor driver IC (not illustrated) included in the first sub-MCU 520 receives an EPB switch signal generated from the EPB switch. When the EPB switch signal is received, the first sub-MCU 520 turns on the first switch 581 connecting the first sub-MCU 520 and the second driver circuit 572. The first sub-MCU 520 provides the EPB switch signal to the first driver circuit 571, and the first switch 581 is turned on to provide the EPB switch signal to the second driver circuit 572 connected to the first sub-MCU 520. Accordingly, the first driver circuit 571 and the second driver circuit 572 control the operations of the connected first motor 111 and the second motor 113, respectively.

As such, when the first sub-MCU 520 is operated normally, the cut-off switch 583 connected between the low arm of the second driver circuit 572 and the ground maintains an off state. Through this, the second switch 582 connecting the second sub-MCU 550 and the second driver circuit 572 is prevented from being turned on such that it is possible to prevent malfunction that the second sub-MCU 550 is operated when the first sub-MCU 520 operates normally.

The second sub-MCU 550 checks whether a fault has occurred in the first sub-MCU 520 by the main MCU 530. The second sub-MCU 550 turns on the second switch 582 connecting the second sub-MCU 550 and the second driver circuit 572 when it is confirmed that a fault has occurred in the first sub-MCU 520. Accordingly, the cut-off switch 583 that is in the off state is converted to the on state. The second sub-MCU 550 receives a WSS sensing signal including the speeds of the wheels 101, 103, 105, 107 of the vehicle from the WSSs 121, 123, 125, 127 described with reference to FIG. 2. When the second sub-MCU 550 identifies that the speed of the wheel received from the WSS is 0, the second sub-MCU 550 provides a driving force to the electric parking brake connected to the second motor 592 by operating the second motor 592 connected to the second driver circuit 572. Through this, even if a fault occurs in the first sub-MCU 520, it is possible to secure the redundancy of the parking brake.

Moreover, in the third example of the present disclosure, it is described as an example that the first switch 581, the second switch 582 and the cut-off switch 583 are field effect transistors (FET) that operate as on/off, but the present disclosure is necessarily not limited thereto and may be implemented as a relay switch.

The EPB system according to the present disclosure includes the main MCU 530 and two sub-MCUs such that not only redundancy of the EPB system itself is secured, but also the service brake and the parking brake may be designed separately, and when a fault has occurred in the service brake, since the EPB drives the driver circuit with 2 channels, it is possible to secure a complete redundancy design. This is because, when the EPB system is used in an emergency situation such as when the service break does not operate, two-channel redundancy of the EPB system is required.

Figure 8:
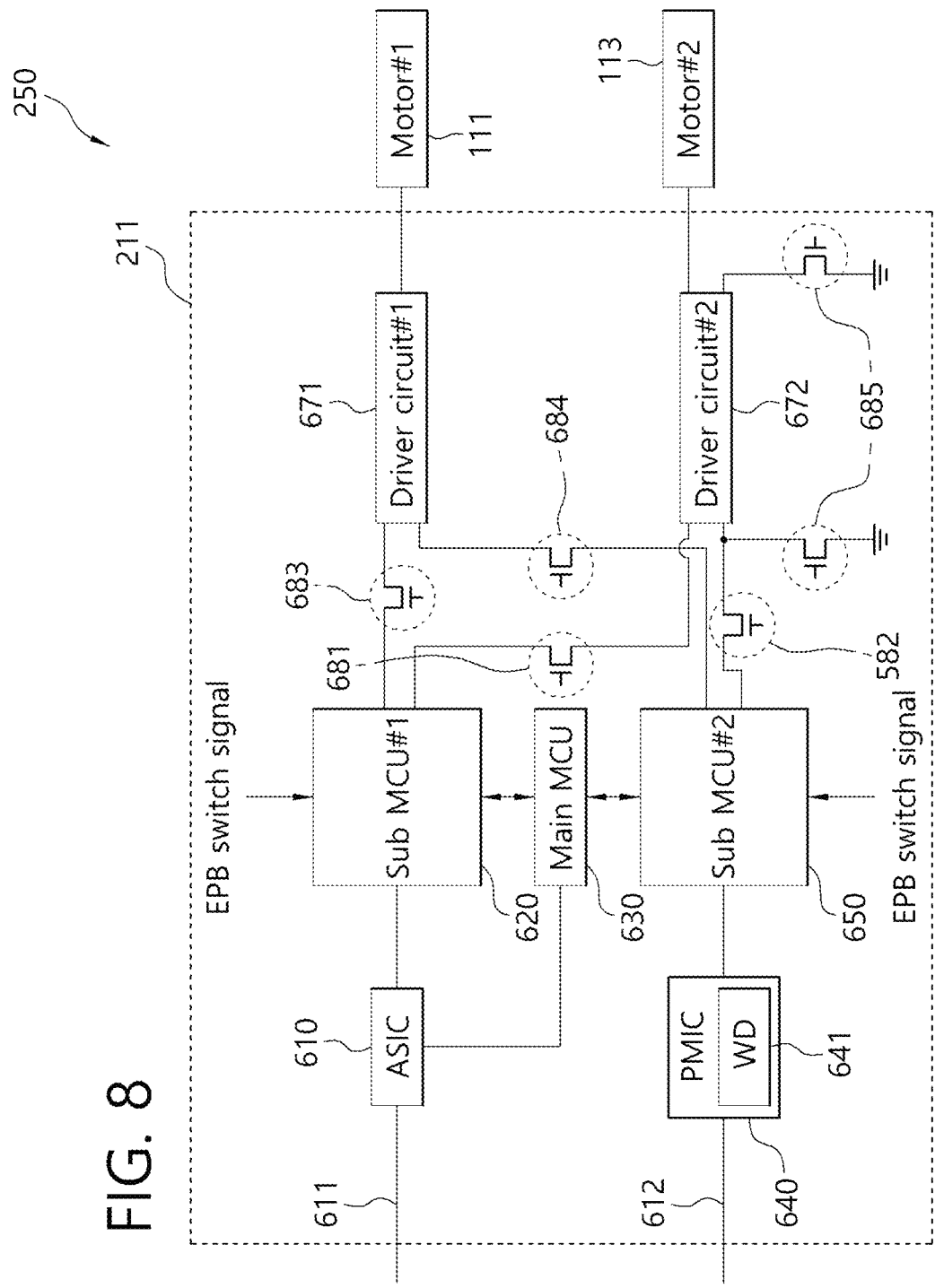
FIG. 8 is a view showing the schematic configuration of an electric parking brake system according to a fourth example of the present disclosure.

FIG. 8 is a view showing the schematic configuration of an electric parking brake system according to a fourth example of the present disclosure.

Referring to FIG. 8, the electric parking brake system according to the fourth example of the present disclosure may include an ECU 211 and motors 111, 113. The ECU 211 includes an ASIC 610, a first sub-MCU 620, a main MCU 630, a first driver circuit 671, a PMIC 640, a second sub-MCU 650 and a second driver circuit 672. In this case, the ECU 211 is different from the ECU 211 described in the third example in that it additionally includes a third switch 683 and a fourth switch 684, but other components and operations are identical and very similar to the third example. Accordingly, only the configurations and operations different from those of the third example will be described.

When the EPB switch signal generated by the EPB switch is received, the first sub-MCU 620 turns on the third switch 683 connecting the first sub-MCU 620 and the first driver circuit 671, and turns on the first switch 681 connecting the first sub-MCU 620 and the second driver circuit 672. The first sub-MCU 620 provides the EPB switch signal to the first driver circuit 671 and the second driver circuit 672. Accordingly, the first driver circuit 671 and the second driver circuit 672 control the operations of the connected first motor 111 and the second motor 113, respectively.

As such, when the first sub-MCU 620 is operated normally, the cut-off switch 685 connected between the low arm of the second driver circuit 672 and the ground maintains an off state. Through this, the second switch 682 connecting the second sub-MCU 650 and the second driver circuit 672 is prevented from being turned on such that it is possible to prevent malfunction that the second sub-MCU 650 is operated when the first sub-MCU 620 operates normally.

The second sub-MCU 650 receives an EPB switch signal through CAN communication when it is confirmed that a fault has occurred in the first sub-MCU 620 through communication with the main MCU 630, and accordingly turns on the second switch connecting the second sub-MCU 650 and the second driver circuit 672. Accordingly, the cut-off switch 685 that is in the off state is converted to the on state. Moreover, the fourth switch 684 connecting the second sub-MCU 650 and the first driver circuit 671 is turned on. The second sub-MCU 650 provides a driving force to the electric parking brake connected to the motor by operating the first motor 111 and the second motor 113 respectively connected to the first driver circuit 671 and the second driver circuit 672 based on the received EPB switch signal. Through this, even if a fault occurs in the first sub-MCU 620, it is possible to secure the redundancy of the parking brake.

Moreover, in the fourth example of the present disclosure, it is described as an example that the first switch 681, the second switch 682, the third switch 683, the fourth switch 684 and the cut-off switch 685 are field effect transistors (FET) that operate as on/off, but the present disclosure is not necessarily limited thereto and may be implemented as a relay switch.

In the third and fourth example, when the vehicle is restarted after operating the second sub-MCUs 550, 650 when a fault has occurred in the first sub-MCUs 520, 620, the status of the first sub-MCUs 520, 620 is checked. When the first sub-MCUs 520, 620 are normal, the cut-off switches 583, 685 are turned off. However, if the first sub-MCUs 520, 620 are still in a faulty state even after the vehicle is restarted, the operation of the second driver circuits 572, 672 must be controlled, and thus, the on state of the cut-off switches 583, 685 may be continuously maintained. However, this may be applied differently according to the requirements of the manufacturer.

It will be apparent to those of ordinary skill in the art that the present disclosure is not limited to the above exemplary embodiments and may be implemented with various modifications and variations without departing from the technical gist of the present disclosure.

The invention claimed is:

1. A control unit of an electric parking brake system, comprising:
    a driver circuit including a first driver circuit and a second driver circuit respectively connected to a first motor and a second motor for providing a driving force to an electric parking brake to control the first motor and the second motor;
    a first MCU (micro control unit) having a plurality of core processors and controlling the first driver circuit and the second driver circuit connected according to reception of an electric parking brake (EPB) switch signal;
    a second sub-MCU having one core processor and connected to at least one of the first driver circuit and the second driver circuit;
    a first switch for connecting the first sub-MCU and the second driver circuit; and
    a second switch for connecting the second sub-MCU and the second driver circuit.

2. The control unit of claim 1, wherein the first MCU and the second MCU perform communication through a data bus.

3. The control unit of claim 1, further comprising:
    a watchdog counter for monitoring an operation of the second sub-MCU from the outside of the second sub-MCU.

4. The control unit of claim 2, wherein the second switch is turned off when the first sub-MCU operates normally.

5. The control unit of claim 2, wherein the second sub-MCU receives the EPB switch signal through in-vehicle communication when a fault occurs in the first sub-MCU, and turns on the second switch to control the second driver circuit.

6. The control unit of claim 1, further comprising:
    a third switch for connecting the first sub-MCU and the first driver circuit.

7. The control unit of claim 6, further comprising:
    a fourth switch for connecting the second sub-MCU and the first driver circuit.

8. The control unit of claim 7, wherein when the first sub-MCU operates normally, the first switch and the third switch are turned on to control the first driver circuit and the second driver circuit.

9. The control unit of claim 7, wherein the second sub-MCU receives the EPB switch signal through in-vehicle communication when a fault occurs in the first sub-MCU, and turns on the second switch and the fourth switch to control the first driver circuit and the second driver circuit.

10. The control unit of claim 4, wherein the second driver circuit further comprises:

a cut-off switch for preventing a malfunction of the second sub-MCU when the first sub-MCU operates normally, wherein the cut-off switch is provided between a low arm of the second driver circuit and a ground.

* * * * *